Feb. 11, 1947.    R. J. HOFFMAN    2,415,674
FLUID PRESSURE CONTROL DEVICE
Filed Oct. 14, 1944
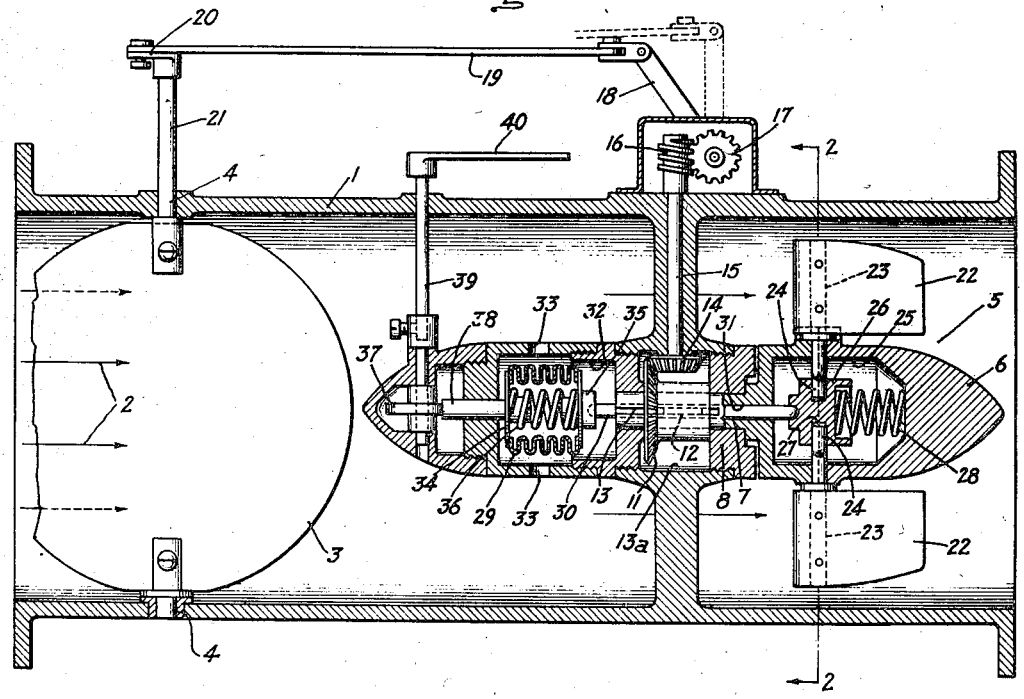
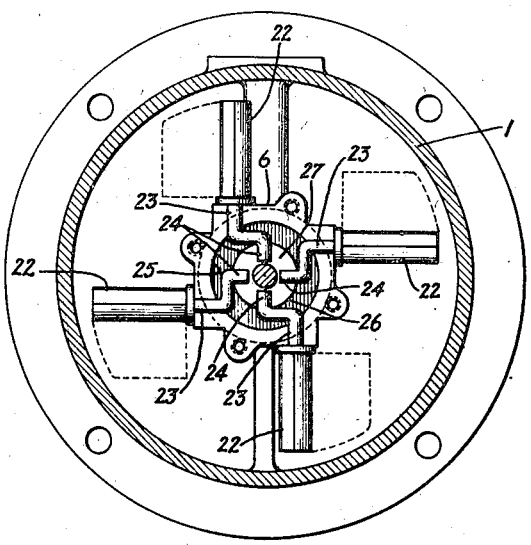
Inventor:
Robert J. Hoffman,
by Harry E. Dunham
His Attorney.

Patented Feb. 11, 1947

2,415,674

UNITED STATES PATENT OFFICE 2,415,674

FLUID PRESSURE CONTROL DEVICE

Robert J. Hoffman, Ballston Lake, N. Y., assignor to General Electric Company, a corporation of New York Application October 14, 1944, Serial No. 558,761

4 Claims. (Cl. 50—10)

This invention relates to a control device, more particularly to a device for regulating the pressure of a flowing fluid, and it has for its object the provision of a control device of this character which is simple and inexpensive in its construction, and also is extremely sensitive in its controlling action.

This invention is particularly useful in controlling the pressure of a fluid flowing in a duct system.

In accordance with this invention, a turbine wheel is provided which is operated by the flowing fluid. The turbine wheel controls suitable fluid pressure regulatable means which sets the pressure of the fluid in the duct. The turbine blades are movable so that their position on the wheel is adjustable; and they are controlled by pressure responsive means so that the speed and direction of rotation of the wheel are such as to control the pressure regulatable means to hold a selected pressure.

For a more complete understanding of this invention, reference should be had to the accompanying drawing in which Fig. 1 is a vertical sectional view of a pressure control device embodying my invention; and Fig. 2 is a sectional view taken through the line 2—2 of Fig. 1 and looking in the direction of the arrows.

Referring to the drawing, this invention has been shown as applied to a pressure regulator which comprises a duct 1 through which the fluid flows in the direction indicated by the arrows 2. The flow and pressure of the fluid is controlled by means of a pressure regulator 3, which in the form of the invention illustrated, is a throttle valve. It is provided with shafts 4 which are journaled in the duct 1 to rotatably mount the valve. It will be understood that the pressure of the fluid on the "down stream" side of the valve, that is, the right-hand side of the valve, as viewed in Fig. 1, will be determined by the pressure of the fluid on the "up stream" side of the valve, that is the left-hand side thereof, and upon the position of the valve; when the valve is operated toward its closed position the "down stream" pressure will be decreased, and conversely when the valve is opened the "down stream" pressure will be increased.

The valve is controlled so as to hold a substantially constant pressure by means of a turbine wheel 5. This wheel comprises a hub 6 having a supporting part 7 journaled in the frame 8.

The hub or wheel 6 is conected to the valve 3 to operate it by a bevel gear 11 keyed to the part 7 by a key 12 on the gear fitted into a slot 13 provided for it in the part 7. The gear 11, as shown, is mounted in a chamber 13a formed in the frame 8. This gear 11 meshes with a bevel gear 14, also mounted in the frame chamber 13a, as shown. The gear 14 is secured to a shaft 15 which projects from the tube 1 and on its projecting end carries a worm 16. This worm operates a worm wheel 17 which in turn operates a crank 18. This crank is connected by means of a link 19 with a crank 20 connected to the valve 3 by means of a shaft 21; which may be and as shown is an extension of the upper shaft 4.

Thus, it will be observed that the position of the valve 3 and hence the "down stream" pressure depends upon the rotation of the turbine wheel 5.

The turbine wheel 5 is provided with a plurality of circumferentially-spaced blades 22. These blades are mounted on shafts 23 which mount the blades for rotation so that their positions on the wheel 5 can be adjusted. The shafts, as shown, are arranged so that the major portions of the blade areas project "down stream."

The shafts 23 are in the form of cranks, as shown, the crank arms 24 extending into the hub 6 which is made hollow to form a chamber 25 for the purpose of receiving the cranks. The cranks 24 are adjusted in unison by means of a collar 26 which has a circular recess 27 in which the cranks extend. When the collar is adjusted axially, the cranks are operated to adjust the positions of the blades 22.

The position of the collar 26 is controlled by a spring 28 which biases the collar toward the left, as viewed in the drawing, and by means of a pressure responsive bellows 29. The bellows controls the position of the collar 26 through a rod 30, which extends through an axial bore 31 formed in the journal 7. The bellows is mounted in a chamber 32 provided in the frame 8. The walls of this chamber are provided with apertures 33 so that the bellows is exposed to the fluid in the tube 1. The bellows preferably will be evacuated, and its two heads 34 and 35 will be loaded by a compression spring 36.

The basic pressure setting of the pressure responsive bellows, and hence of the blades 22 is effected by adjusting the position of the bellows, and this is accomplished by means of a cam 37 which coacts with a plunger 38 connected to the outer head 34. The cam 37 is operated by a shaft 39 which extends from the tube 1. An operating handle 40 is secured to the shaft 39.

In the operation of the device, it will be understood that if the pressure of the fluid be at the value set by the lever 40, the blades 22 will be positioned straight "down stream" and as a result thereof the valve 3 will be held stationary. If the pressure should rise above the predetermined value, the bellows will be contracted, and the spring 28 will move the blades at an angle to the "down stream" direction and cause the turbine wheel 5 to rotate and close the valve 3 somewhat. The valve 3 will be turned toward its closed position until the desired predetermined pressure is attained when again the blades 22 will be straight "down stream." Conversely, should the pressure fall below the desired value, the bellows will expand and force the collar 26 toward the right and adjust the blades 22 in the opposite direction. This will cause the wheel 5 to rotate in the reverse direction so as to open the valve and thereby restore the pressure to the desired value.

The predetermined pressure held by the device is controlled by setting the handle 40.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A control device for controlling a flowing fluid comprising, a duct through which the fluid flows, a turbine wheel within said duct having blades acted upon by the flowing fluid so as to control the rotation of said wheel, fluid pressure regulating means constructed and arranged to be controlled by said turbine wheel, said blades being rotatably mounted on said wheel so that their positions with reference thereto can be changed both to control the velocity of said wheel and its direction of rotation, a pressure responsive bellows in said duct, and connection means between said bellows and said blades for adjusting the positions of said blades with reference to said wheel so as to control both said velocity and direction of rotation of said wheel to hold a predetermined pressure in said duct.

2. A control device for controlling a flowing fluid comprising, a duct through which the fluid flows, a turbine wheel within said duct having blades acted upon by the flowing fluid so as to control the rotation of said wheel, fluid pressure regulating means constructed and arranged to be controlled by said turbine wheel, said blades being rotatably mounted on said wheel so that their positions with reference thereto can be changed both to control the velocity of said wheel and its direction of rotation, a pressure responsive bellows in said duct, and connection means between said bellows and said blades for adjusting the positions of said blades with reference to said wheel so as to control both said velocity and direction of rotation of said wheel to hold a predetermined pressure in said duct, and means for adjusting the action of said bellows to adjust the pressure held in said duct.

3. A control device for controlling the pressure of a flowing fluid comprising, a duct through which the fluid flows, a valve in said duct for controlling the fluid pressure, a turbine wheel in said duct connected to said valve in order to control its position and thereby the fluid pressure, a plurality of blades on said wheel, cranks for rotating said blades to adjust their positions on said wheel and thereby the speed and direction of rotation of said wheel, a pressure responsive bellows in said duct, and connection means between said bellows and said cranks for operating the cranks to adjust the positions of said blades in accordance with the pressure of the fluid in said duct.

4. A control device for controlling a flowing fluid comprising, a duct through which the fluid flows, a turbine wheel within said duct having blades adjustable so that their angular position may be changed both to control the direction of rotation of said wheel and also its speed of rotation, fluid pressure regulating means constructed and arranged to be controlled by said turbine wheel operative when said wheel rotates in one direction to decrease the pressure and when said wheel rotates in the other direction to increase the pressure, and pressure responsive means responsive to the pressure of the fluid in said duct constructed and arranged for adjusting the position of said blades so that when said pressure is at a predetermined value said blades are positioned to hold said wheel stationary, and when said pressure is above said predetermined value said blades are adjusted in such direction that said wheel is caused to rotate in said one direction in order to decrease the pressure to said predetermined value and when said pressure falls below said predetermined value said blades are adjusted in such direction as to cause said wheel to rotate in said other direction in order to increase said pressure to said predetermined value.

ROBERT J. HOFFMAN.

REFERENCES CITED

The following references are of record in the file of this patent:

UNITED STATES PATENTS

| Number | Name | Date |
|---|---|---|
| 1,384,672 | Murray | July 12, 1921 |
| 1,555,422 | Lorenzon | Sept. 29, 1925 |
| 1,089,275 | Schindler | Mar. 3, 1914 |
| 2,313,149 | Jacobsson | Mar. 9, 1943 |
| 1,325,615 | Berdon | Dec. 23, 1919 |
| 1,311,202 | Anderson | July 29, 1919 |